United States Patent
Imamura

(10) Patent No.: US 11,453,384 B2
(45) Date of Patent: Sep. 27, 2022

(54) VEHICLE CONTROL SYSTEM

(71) Applicant: TOYOTA JIDOSHA KABUSHIKI KAISHA, Toyota (JP)

(72) Inventor: Tatsuya Imamura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 238 days.

(21) Appl. No.: 16/904,728

(22) Filed: Jun. 18, 2020

(65) Prior Publication Data

US 2021/0016767 A1    Jan. 21, 2021

(30) Foreign Application Priority Data

Jul. 18, 2019  (JP) .............................. JP2019-132576

(51) Int. Cl.

| | |
|---|---|
| *B60W 20/10* | (2016.01) |
| *B60K 6/28* | (2007.10) |
| *B60K 17/02* | (2006.01) |
| *B60W 20/40* | (2016.01) |
| *B60W 10/06* | (2006.01) |
| *B60W 10/08* | (2006.01) |
| *B60K 6/36* | (2007.10) |
| *B60K 17/16* | (2006.01) |

(52) U.S. Cl.
CPC .............. *B60W 20/40* (2013.01); *B60K 6/28* (2013.01); *B60K 6/36* (2013.01); *B60K 17/02* (2013.01); *B60K 17/16* (2013.01); *B60W 10/06* (2013.01); *B60W 10/08* (2013.01); *B60W 20/10* (2013.01); *B60W 2510/0657* (2013.01); *B60W 2510/081* (2013.01); *B60W 2510/083* (2013.01); *B60W 2510/242* (2013.01)

(58) Field of Classification Search
CPC ...... B60W 20/40; B60W 10/06; B60W 10/08; B60W 20/10; B60W 2510/0657; B60W 2510/081; B60W 2510/083; B60W 2510/242; B60K 6/28; B60K 6/36; B60K 17/02; B60K 17/16
See application file for complete search history.

(56) References Cited

U.S. PATENT DOCUMENTS

| | | |
|---|---|---|
| 2015/0021110 A1 | 1/2015 | Ono et al. |
| 2016/0368361 A1 | 12/2016 | Endo et al. |
| 2020/0298822 A1* | 9/2020 | Miyamoto ............ B60W 10/06 |

FOREIGN PATENT DOCUMENTS

| | | | | |
|---|---|---|---|---|
| CN | 103847492 A | * | 6/2014 | |
| CN | 107054053 A | * | 8/2017 | ............ B60W 10/02 |
| JP | 5333267 B2 | * | 11/2013 | |

(Continued)

*Primary Examiner* — Tisha D Lewis
(74) *Attorney, Agent, or Firm* — Oliff PLC

(57) ABSTRACT

A vehicle control system configured to limit damage to an electric storage device even if a speed of a motor is changed abruptly. The control system includes a differential mechanism connected to an engine, a motor, and drive wheels, and a clutch. The control system includes a controller is configured to calculate an upper limit power possible to be applied or discharged to or from an electric storage device when a condition to engage the clutch is satisfied and restrict the electric power to be applied or discharged to or from the electric storage device when the electric power is equal to or less than a maximum allowable power that is less than the upper limit power before the clutch is engaged.

11 Claims, 13 Drawing Sheets

(56) References Cited

FOREIGN PATENT DOCUMENTS

| JP | 2017-007437 A | 1/2017 |
| JP | 2018-103690 A | 7/2018 |
| WO | 2013/114594 A1 | 8/2013 |

\* cited by examiner

Fig. 3

| Operating Mode | | CL1 | CL2 | B1 | MG1 | MG2 | ENG |
|---|---|---|---|---|---|---|---|
| HV Mode | HV-Low Mode | ● | – | – | G | M | ON |
| | HV-High Mode | – | ● | – | G | M | ON |
| | Fixed Mode | ● | ● | – | | M | ON |
| EV Mode | Dual-Motor Mode EV-Low Mode | ● | – | ● | M | M | OFF |
| | EV-High Mode | – | ● | ● | M | M | OFF |
| | Single-Motor Mode | – | – | – | | M | OFF |

VEHICLE CONTROL SYSTEM

CROSS-REFERENCE TO RELATED APPLICATIONS

The present disclosure claims the benefit of Japanese Patent Application No. 2019-132576 filed on Jul. 18, 2019 with the Japanese Patent Office, the disclosures of which are incorporated herein by reference in its entirety.

BACKGROUND

Field of the Disclosure

Embodiments of the present disclosure relate to the art of a control system for a vehicle comprising a prime mover including an engine and a motor, and another motor that applies reaction torque to a differential mechanism to deliver output torque of the prime mover to drive wheels through the differential mechanism.

Discussion of the Related Art

JP-A-2017-7437 and JP-A-2018-103690 describe, respectively, a hybrid vehicle comprising a prime mover including an engine and a motor, and a power distribution mechanism including two sets of planetary gear units. In the power distribution mechanism, one of the rotary elements is connected to the engine, another one of rotary elements is connected to the motor, and still another one of the rotary elements is connected to a pair of drive wheels. In the hybrid vehicle, a first clutch is disposed between one of the rotary elements of one of the planetary gear unit and one of the rotary elements of the other planetary gear unit, and a second clutch is arranged to selectively connect any two of the rotary elements of the other planetary gear unit. An operating mode of the hybrid vehicle can be selected from a low mode established by engaging the first clutch, a high mode established by engaging the second clutch, a fixed mode established by engaging both of the first clutch and the second clutch, and a single-motor mode established by disengaging the first clutch and the second clutch. In the low mode, a torque delivered from the engine to the drive wheels is relatively large, and in the high mode, the torque delivered from the engine to the drive wheels is relatively small. In the fixed mode, the torque generated by the engine is delivered to the drive wheels without being changed. In the single-motor mode, the hybrid vehicle is propelled by a torque generated by a second motor while interrupting torque transmission between the engine and the drive wheels.

In a case of propelling the above-explained hybrid vehicle by the engine in a hybrid mode, the operating mode can be selected from a hybrid-low mode established by engaging the first clutch, and a hybrid-high mode established by engaging the second clutch. During propulsion in the hybrid mode, in one of the planetary gear unit, an input element is connected to the engine, a reaction element is connected to a first motor, and an output element is connected to the drive wheels through the other planetary gear unit. In the high mode and the low mode of the hybrid mode, a speed of the engine can be changed by changing a reaction torque established by the first motor, and each of the planetary gear units performs a differential rotation except under specific condition. In this situation, although the rotary elements connected to the engaged clutch are rotated at a same speed, the rotary elements connected to the disengaged clutch are rotated at different speeds. That is, during propulsion in the high mode and the low mode of the hybrid mode, a differential rotation is caused between the rotary elements connected to the disengaged clutch.

During propulsion in the hybrid mode, the operating mode is selected based on a vehicle speed, a required drive force represented by a position of an accelerator pedal, a state of charge level of a battery and so on. Specifically, the operating mode is shifted when the accelerator pedal is depressed, or when a vehicle speed is reduced. For example, in a case of shifting the operating mode from the high mode to the low mode, the second clutch being engaged is disengaged and the first clutch being disengaged is engaged. In this situation, the input rotary element and the output rotary element of the first clutch being disengaged are rotated at different speeds, therefore, if the first clutch is engaged compulsory, rotational speeds of the rotary members, the engine, the first motor etc. connected to the first clutch will be changed.

For example, a friction clutch and a dog clutch may be adopted as the above-explained clutches employed in the hybrid vehicles described in JP-A-2017-7437 and JP-A-2018-103690. The friction clutch may be engaged gradually while slipping and hence such speed difference between the input rotary element and the output rotary element may be reduced gradually. However, when a position of the accelerator pedal or a vehicle speed is changed abruptly, the friction clutch has to be engaged abruptly to shift the operating mode promptly. On the other hand, the dog clutch is adapted to be engaged and disengaged completely. In other words, a torque transmitting capacity is changed only between 0% and 100%. That is, when the dog clutch is engaged, the torque transmitting capacity thereof is reduced immediately to zero.

As a result of engaging the clutch, in the hybrid vehicles described in JP-A-2017-7437 and JP-A-2018-103690, a rotational speed of the first motor is changed abruptly. Amounts of power generation and power consumption by the first motor are governed by an output torque and a rotational speed of the first motor. Therefore, if the rotational speed of the first motor is thus changed abruptly, an electric power may be consumed or generated drastically by the first motor. As a result, an electric power greater than an upper limit value of an output power may be discharged from the battery, and an electric power greater than an upper limit value of an input power may be supplied to the battery. That is, the battery may be damaged by such abrupt change in power generation and power consumption by the first motor.

SUMMARY

Aspects of embodiments of the present disclosure have been conceived noting the foregoing technical problems, and it is therefore an object of the present disclosure to provide a vehicle control system configured to limit damage to an electric storage device even if a speed of a motor is changed abruptly by engaging an engagement device.

The vehicle control system according to the exemplary embodiment of the present disclosure is applied to a vehicle comprising: a prime mover; a first motor having a generating function; at least a pair of drive wheels; an electric storage device from which an electric power is supplied to the first motor, and to which an electric power generated by the first motor is supplied; a differential mechanism that comprises a plurality of rotary elements including a rotary element connected to the prime mover, another rotary element connected to the first motor, and still another rotary element connected to the drive wheels, that delivers torque of the prime mover at least partially to the drive wheels when a reaction torque established by the first motor is applied thereto; and an engagement device that is selectively engaged to transmit torque between a predetermined pair of the plurality of rotary elements of the differential mechanism. In the vehicle to which the control system is applied, a speed of one of the rotary elements of the predetermined pair of the rotary elements is changed with a change in a speed of the first motor, and the engagement device is allowed to be engaged when a speed difference between the predetermined pair of the rotary elements is less than a predetermined value. In order to achieve the above-explained objective, according to the exemplary embodiment of the present disclosure, the control system is provided with a controller that controls the electric power applied to the electric storage device and the electric power discharged from the electric storage device. Specifically, wherein the controller is configured to: calculate an upper limit power possible to be discharged from the electric storage device or possible to be applied to the electric storage device when a condition to engage the engagement device being disengaged is satisfied; and restrict the electric power to be discharged from the electric storage device or to be applied to the electric storage device equal to or less than a maximum allowable power to be consumed or generated by the first motor that is less than the upper limit power before the engagement device is engaged.

In a non-limiting embodiment, the upper limit power may be governed by specifications of the electric storage device. In addition, the controller may be further configured to: calculate a change amount of the electric power to be generated or consumed by the first motor by engaging the engagement device; and calculate the maximum allowable power by subtracting the change amount of the electric power from the upper limit power.

In a non-limiting embodiment, the controller may be further configured to: calculate the change in the speed of the first motor to be caused by engaging the engagement device; and calculate the change amount of the electric power based on the change in the speed of the first motor and a torque of the first motor.

In a non-limiting embodiment, the controller may be further configured to calculate the maximum allowable power by subtracting the change amount of the electric power and a predetermined electric power from the upper limit power.

In a non-limiting embodiment, the engagement device may comprise an avoidance mechanism that prevents undesirable engagement of the engagement device when the speed difference in the engagement device is equal to or greater than the predetermined value.

In a non-limiting embodiment, the predetermined value at which the engagement device is allowed to be engaged may vary depending on whether a speed of the one of the rotary elements of the predetermined pair of the rotary elements is faster than the other one of the rotary elements of the predetermined pair of the rotary elements.

In a non-limiting embodiment, the controller may be further configured to restrict the torque of the first motor so as to restrict the electric power to be discharged from the electric storage device or to be applied to the electric storage device equal to or less than the maximum allowable power.

In a non-limiting embodiment, the controller may be further configured to restrict an output torque of the prime mover in accordance with the restriction on the torque of the first motor.

In a non-limiting embodiment, the vehicle may further comprise a second motor that is connected to the drive wheels in a torque transmittable manner, and to the first motor to exchange the electric power therebetween. In addition, the controller may be further configured to restrict the torque of the second motor so as to restrict the electric power to be discharged from the electric storage device or to be applied to the electric storage device equal to or less than the maximum allowable power before the engagement device is engaged.

In a non-limiting embodiment, the controller may be further configured to: determine whether an actual electric power currently being consumed or generated is greater than the maximum allowable power while the engagement device is still disengaged; and restrict the electric power to be discharged from the electric storage device or to be applied to the electric storage device equal to or less than the maximum allowable power, when actual electric power is greater than the maximum allowable power.

In a non-limiting embodiment, the controller may be further configured to: determine whether the engagement device is engaged; and cancel the restriction on the electric power to be discharged from the electric storage device or to be applied to the electric storage device equal to or less than the maximum allowable power when an engagement of the engagement device is determined.

Thus, in the vehicle to which the control system according to the exemplary embodiment of the present disclosure is applied, the differential mechanism is connected to the prime mover, the first motor, and the drive wheels. Therefore, the torque of the prime mover can be delivered to the drive wheels by establishing the reaction torque by the first motor. In the differential mechanism, the predetermined pair of the rotary elements are connected to each other by engaging the engagement device, and the speed of one of the rotary elements of the predetermined pair is changed with a change in a speed of the first motor. That is, a speed difference between the predetermined pair of the rotary elements can be controlled by controlling the speed of the first motor. In other words, the speed of the first motor is changed with a change in the speed difference between the predetermined pair of the rotary elements. According to the exemplary embodiment of the present disclosure, the control system predicts a power generation or consumption by the first motor when engaging the engagement device, and restricts an input power or output power to/from the electric storage device connected to the first motor before the engagement device is engaged. According to the exemplary embodiment of the present disclosure, therefore, overcharge or over discharge of the electric storage device can be prevented even if the power generation or power consumption of the first motor is changed abruptly by engaging the engagement device. For this reason, damage to the electric storage device can be limited.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 3 is a table showing engagement states of the clutches and operating conditions of the prime movers in each operating mode;

DETAILED DESCRIPTION OF THE PREFERRED EMBODIMENT(S)

Figure 1:
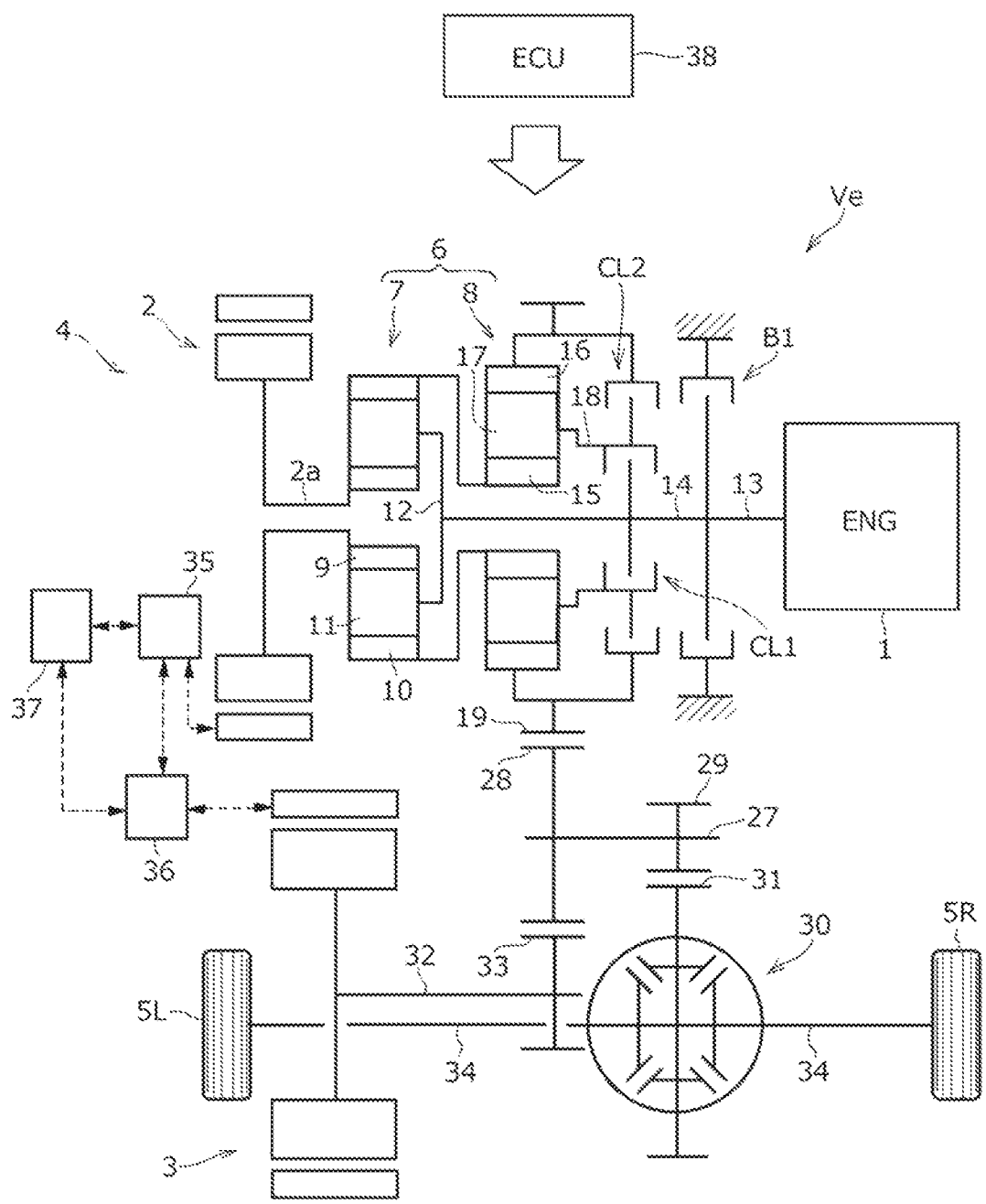
FIG. 1 is a skeleton diagram schematically showing a structure of a vehicle to which the control system according to the exemplary embodiment of the present disclosure is applied.

An exemplary embodiment of the present disclosure will now be explained with reference to the accompanying drawings. Referring now to FIG. 1, there is shown one example of a structure of a hybrid vehicle (as will be simply called the "vehicle" hereinafter) Ve to which the control system according to the exemplary embodiment of the present disclosure is applied. Specifically, FIG. 1 shows a hybrid drive unit (as will be simply called the "drive unit" hereinafter) 4 of the vehicle Ve that drives a pair of front wheels 5R and 5L, and the drive unit 4 comprises an engine (referred to as "ENG" in the drawings) 1 as a prime mover of the drive unit 4, a first motor (referred to as "MG1" in the drawings) 2, and a second motor (referred to as "MG2" in the drawings) 3. According to the exemplary embodiment, a motor-generator having a generating function is adopted as the first motor 2. In the vehicle Ve, a speed of the engine 1 is controlled by the first motor 2, and the second motor 3 is driven by electric power generated by the first motor 2 to generate a drive torque for propelling the vehicle Ve. Optionally, the motor-generator having a generating function may also be employed as the second motor 3.

A power split mechanism 6 as a differential mechanism is connected to the engine 1. The power split mechanism 6 includes a power split section 7 that distributes torque generated by the engine 1 to the first motor 2 side and to an output side, and a transmission section 8 that alters a torque split ratio.

For example, a single-pinion planetary gear unit adapted to perform differential action among three rotary elements may be employed as the power split section 7. Specifically, the power split section 7 as a first differential mechanism comprises: a sun gear 9; a ring gear 10 as an internal gear arranged concentrically around the sun gear 9; a plurality of pinion gears 11 interposed between the sun gear 9 and the ring gear 10 while being meshed with both gears 9 and 10; and a carrier 12 supporting the pinion gears 11 in a rotatable manner.

An output shaft 13 of the engine 1 is connected to an input shaft 14 of the power split mechanism 6 connected to the carrier 12 so that the torque of the engine 1 is applied to the carrier 12, and the sun gear 9 of the power split section 7 is connected to the first motor 2. Optionally, an additional gear unit may be interposed between the input shaft 14 and the carrier 12, and a damper device and a torque converter may be interposed between the output shaft 13 and the input shaft 14. Likewise, an additional gear unit may also be interposed between the first motor 2 and the sun gear 9.

The transmission section 8 is also a single-pinion planetary gear unit comprising: a sun gear 15; a ring gear 16 as an internal gear arranged concentrically around the sun gear 15; a plurality of pinion gears 17 interposed between the sun gear 15 and the ring gear 16 while being meshed with both gears 15 and 16; and a carrier 18 supporting the pinion gears 17 in a rotatable manner. Thus, the transmission section 8 as a second differential mechanism is also adapted to perform a differential action among the sun gear 15, the ring gear 16, and the carrier 18. In the transmission section 8, the sun gear 15 is connected to the ring gear 10 of the power split section 7, and the ring gear 16 is connected to an output gear 19.

In order to use the power split section 7 and the transmission section 8 as a complex planetary gear unit, a first clutch CL1 as a first engagement device is disposed to selectively connect the carrier 18 of the transmission section 8 to the carrier 12 of the power split section 7 connected to the input shaft 14. For example, a dog clutch may be adopted as the first clutch CL1. Thus, in the drive unit 4 shown in FIG. 1, the power split section 7 is connected to the transmission section 8 to serve as a complex planetary gear unit by engaging the first clutch CL1. In the complex planetary gear unit thus formed, the carrier 12 of the power split section 7 is connected to the carrier 18 of the transmission section 8 to serve as an input element, the sun gear 9 of the power split section 7 serves as a reaction element, and the ring gear 16 of the transmission section 8 serves as an output element. That is, in the complex planetary gear unit, the input shaft 14, the output shaft 2a of the first motor 2, and the ring gear 16 are allowed to rotate in a differential manner to one another. Given that the first clutch CL1 serves as an "engagement device" of the embodiment, the carrier 12 serves as "one of the rotary elements", and the carrier 18 serves as the "other one of the rotary elements" of the embodiment.

A second clutch CL2 as a second engagement device is arranged to rotate the rotary elements of the transmission section 8 integrally. For example, the dog clutch may also be adopted as the second clutch CL2, and the second clutch CL2 selectively connects the carrier 18 to the ring gear 16 or the sun gear 15, or connects the sun gear 15 to the ring gear 16. In the drive unit 4 shown in FIG. 1, specifically, the second clutch CL2 selectively connects the carrier 18 to the ring gear 16 to rotate the rotary elements of the transmission section 8 integrally. In a case that the second clutch CL2 is in engagement, the carrier 12 of the power split section 7 also serves as an input element, the sun gear 9 of the power split section 7 also serves as a reaction element, and the ring gear 16 of the transmission section 8 also serves as an output element. That is, in the case that the second clutch CL2 is in engagement, the input shaft 14, the output shaft 2a of the first motor 2, and the ring gear 16 are also allowed to rotate in a differential manner to one another. Given that the second clutch CL2 serves as the "engagement device" of the embodiment, the carrier 18 serves as "one of the rotary elements", and the ring gear 16 serves as the "other one of the rotary elements" of the embodiment.

Figure 2:
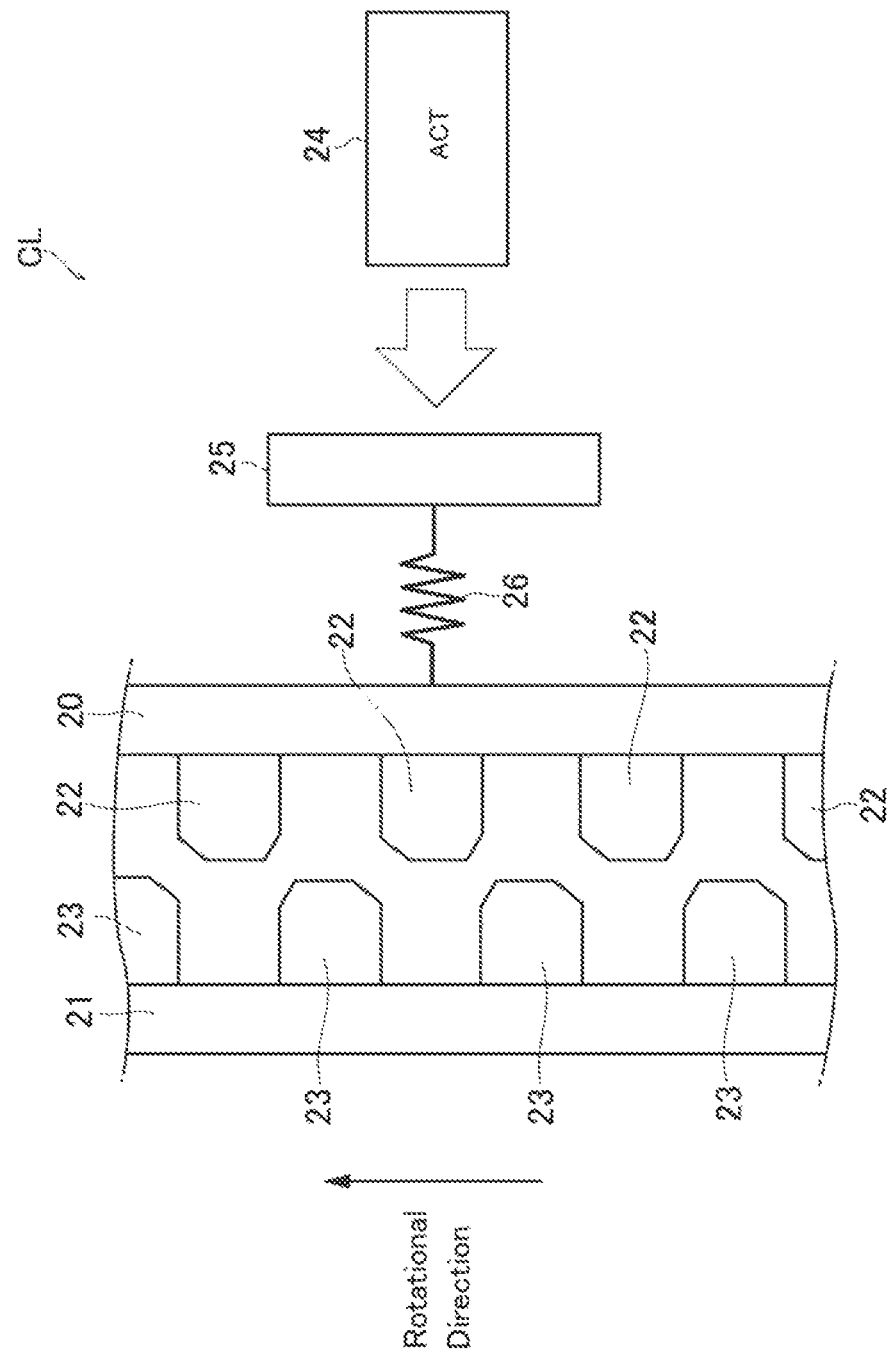
FIG. 2 is a partially enlarged view showing an example of a structure of a clutch.

One example of a structure of each of the first clutch CL1 and the second clutch CL2 is schematically shown in FIG. 2. Since the first clutch CL1 and the second clutch CL2 may have a common structure, the first clutch CL1 and the second clutch CL2 will also be described commonly as the "clutch CL" in the following explanations. As illustrated in FIG. 2, the clutch CL comprises a pair of rotary members 20 and 21 opposed to each other. A set of dog teeth 22 is formed on one of the rotary members 20, and a set of dog teeth 23 is formed on the other one of the rotary members 21. The rotary member 20 is connected to an actuator (referred to as "ACT" in FIG. 2) 24 so that a thrust force is applied to the rotary member 21 in accordance with a hydraulic pressure or an electromagnetic force supplied to the actuator 24. In order to receive the thrust force applied from the actuator 24, a pressure receiving member 25 is connected to a back surface of the rotary member 20 (opposite to a surface on which the dog teeth 22 are formed) to be rotated integrally with the rotary member 20 through an elastic member 26 such as a spring serving as an avoidance mechanism.

Each tooth tip of the dog teeth 22 and each tooth tip of the dog teeth 23 is individually chamfered so that the rotary members 20 and 21 are engaged to each other smoothly even if the rotary members 20 and 21 are rotated at different speeds, and even if the rotary members 20 and 21 are in phase with each other. Specifically, given that the rotary members 20 and 21 are rotated in a direction indicated by the arrow in FIG. 2, a width of the front chamfered surface of each of the dog teeth 22 of the rotary member 20 is individually set wider than a width of the rear chamfered surface of each of the dog teeth 22, and a width of the front chamfered surface of each of the dog teeth 23 of the rotary member 21 is individually set narrower than a width of the rear chamfered surface of each of the dog teeth 23.

Given that the clutch CL shown in FIG. 2 is adopted as the first clutch CL1, the rotary member 20 serves as the carrier 18 or a rotary member rotated integrally therewith, and the rotary member 21 serves as the carrier 12 connected to the input shaft 14 or a rotary member rotated integrally therewith. Given that the clutch CL shown in FIG. 2 is adopted as the second clutch CL2, the rotary member 20 serves as the carrier 18 or the rotary member rotated integrally therewith, and the rotary member 21 serves as the ring gear 16 or a rotary member rotated integrally therewith.

For example, the actuator 24 may be a cam mechanism comprising: a drum on which a cam groove is formed; a sleeve moving along the cam groove to switch an engagement state of the first clutch CL1; a sleeve moving along the cam groove to switch an engagement state of the second clutch CL2; and an actuator rotating the drum.

A counter shaft 27 extends parallel to a common rotational axis of the engine 1, the power split section 7, and the transmission section 8. A driven gear 28 is fitted onto one end of the counter shaft 27 to be meshed with the output gear 19, and a drive gear 29 is fitted onto the other end of the counter shaft 27 to be meshed with a ring gear 31 of a differential gear unit 30 as a final reduction. The driven gear 28 is also meshed with a drive gear 33 fitted onto a rotor shaft 32 of the second motor 3 so that output torque of the second motor 3 is synthesized with torque of the output gear 19 at the driven gear 28 to be distributed from the differential gear unit 30 to the front wheels 5R and 5L via each of the drive shafts 34.

In order to selectively stop a rotation of the engine 1 when operating the first motor 2 as a prime mover, a brake B1 as a third engagement device is arranged in the drive unit 4 between a predetermined stationary member and the output shaft 13 or the input shaft 14. For example, a frictional engagement device or a dog brake may be adopted as the brake B1. Specifically, by applying the first brake B1 to halt the output shaft 13 or the input shaft 14, the carrier 12 of the power split section 7 and the carrier 18 of the transmission section 8 are allowed to serve as reaction elements, and the sun gear 9 of the power split section 7 is allowed to serve as an input element.

A first power control system 35 is connected to the first motor 2, and a second power control system 36 is connected to the second motor 3. Each of the first power control system 35 and the second power control system 36 individually includes an inverter and a converter. The first power control system 35 and the second power control system 36 are connected to each other, and also connected individually to an electric storage device 37 including a lithium ion battery and a capacitor. Therefore, electric power can be exchanged directly between the first power control system 35 and the second power control system 36 without passing through the electric storage device 37. In addition, when the first motor 2 is operated as a generator while establishing a reaction torque, electric power generated by the first motor 2 may be supplied directly to the second motor 3 without passing through the electric storage device 37.

Characteristics of the lithium ion battery, the capacitor, and the solid-state battery adopted as the electric storage device 37 are different from one another. Therefore, the electric storage device 37 may also be formed by combining those storage devices arbitrarily according to need.

In order to control the first power control system 35, the second power control system 36, the engine 1, the first clutch CL1, the second clutch CL2, the brake B1 and so on, the vehicle Ve is provided with an electronic control unit (to be abbreviated as the "ECU" hereinafter) 38 as a controller. The ECU 38 comprises a microcomputer as its main constituent that is configured to execute a calculation based on incident data transmitted from sensors as well as maps and formulas installed in advance, and transmits a calculation result to e.g., the engine 1, the motors 2 and 3, and the clutches CL1 and CL2 in the form of command signal. For example, the ECU 38 receives data about; a vehicle speed; an accelerator position representing a required drive force; a speed of the first motor 2; a speed of the second motor 3; a speed of the output shaft 13 of the engine 3; an output speed such as a rotational speed of the counter shaft 27 of the transmission section 8; strokes of pistons (i.e., pressure receiving members 25) of the clutches CL1 and CL2; a temperature of the electric storage device 37; temperatures of the power control systems 35 and 36; a temperature of the first motor 2; a temperature of the second motor 3; a temperature of oil (i.e., ATF) lubricating the power split section 7 and the transmission section 8; a state of charge level of the electric storage device 37 and so on.

Specifically, based on the above-mentioned data sent to the ECU 38, the ECU 38 computes: operating conditions (e.g., output torques and rotational speeds) of the engine 1, the first motor 2, and the second motor 3; and demands to actuate the first clutch CL1, the second clutch CL2, and the brake B1. As described, the computation results are transmitted to the engine 1, the first motor 2, the second motor 3, the first clutch CL1, the second clutch CL2, and the brake B1 in the form of command signal.

Specifically, in order to control an output power, an output torque, and a rotational speed of the engine 1, the ECU 38 calculates current values and pulse numbers to control opening degrees of an electronic throttle valve, an EGR (Exhaust Gas Restriction) valve, an intake valve, and an exhaust valve, and to ignite fuel by an ignition device. Calculation results are transmitted from the ECU 31 to the valves and the ignition device in the form of command signals.

In the vehicle Ve, an AC motor is adopted as the first motor 2 and the second motor 3 respectively. Therefore, in order to control the first motor 2 and the second motor 3, command signals to control current values to be applied to the first motor 2 and the second motor 3 are transmitted from the ECU 38 to the first power control system 35 and the second power control system 36. Specifically, the command signals to control the first motor 2 and the second motor 3 include command signals for controlling a frequency of a current generated by the inverter and a voltage value boosted by the converter.

In order to manipulate the first clutch CL1 and the second clutch CL2, current is supplied to the actuator 24 of each of the first clutch CL1 and the second clutch CL2 based on the demands to actuate the first clutch CL1 and the second clutch CL2 determined by the ECU 38. Optionally, a plurality of ECUs 38 may be arranged to control the engine 1, the first motor 2, the second motor 3, the first clutch CL1, the second clutch CL2, and the brake B1 respectively.

In the vehicle Ve having the drive unit 4, an operating mode may be selected from a hybrid mode (to be abbreviated as the "HV mode" hereinafter) in which the vehicle Ve is propelled by a drive torque generated by the engine 1, and an electric vehicle mode (to be abbreviated as the "EV mode" hereinafter) in which the vehicle Ve is propelled by drive torques generated by the first motor 2 and the second motor 3 without activating the engine 1. The HV mode may be selected from a hybrid-low mode (to be abbreviated as the "HV-Low mode" hereinafter), a hybrid-high mode (to be abbreviated as the "HV-High mode" hereinafter), and a fixed mode. Specifically, in the HV-Low mode, torque delivered to the ring gear 16 of the transmission section 8 (or the output gear 19) by generating a predetermined torque by the engine 1 is relatively large. By contrast, in the HV-High mode, the torque delivered to the ring gear 16 of the transmission section 8 by generating the predetermined torque by the engine 1 is relatively small. In the fixed mode, the torque generated by the engine 1 is delivered to the ring gear 16 of the transmission section 8 without being changed.

The EV mode may be selected from a dual-motor mode in which both of the first motor 2 and the second motor 3 generate drive torques to propel the vehicle Ve, and a single-motor mode (or a disconnecting mode) in which only the second motor 3 generates a drive torque to propel the vehicle Ve. Further, the dual-motor mode may be selected from an electric vehicle-low mode (to be abbreviated as the "EV-Low mode" hereinafter) in which a torque of the first motor 2 is multiplied by a relatively larger factor, and an electric vehicle-high mode (to be abbreviated as the "EV-High mode" hereinafter) in which a torque of the first motor 2 is multiplied by a relatively smaller factor. In the single-motor mode, the vehicle Ve is powered only by the second motor 3, while engaging the first clutch CL1, while engaging the second clutch CL2, or while disengaging both of the first clutch CL1 and the second clutch CL2.

FIG. 3 shows engagement states of the first clutch CL1, the second clutch CL2, and the first brake B1, and operating conditions of the first motor 2, the second motor 3, and the engine 1 in each operating mode. In FIG. 3, "●" represents that the engagement device is in engagement, "-" represents the engagement device is in disengagement, "G" represents that the motor serves mainly as a generator, "M" represents that the motor serves mainly as a motor, blank represents that the motor serves as neither a motor nor a generator or that the motor is not involved in propulsion of the vehicle Ve, "ON" represents that the engine 1 generates a drive torque, and "OFF" represents that the engine 1 does not generate a drive torque.

Figure 4:
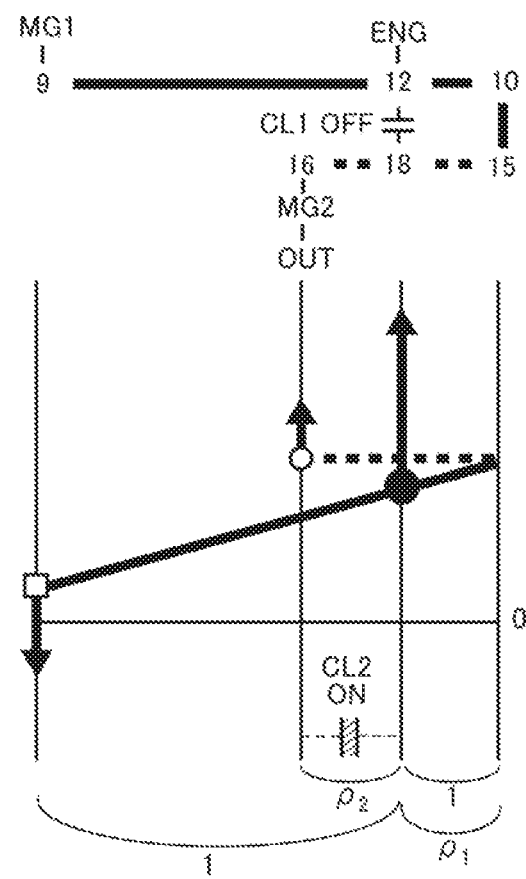
FIG. 4 is a nomographic diagram showing a situation in a HV-High mode.
Figure 5:
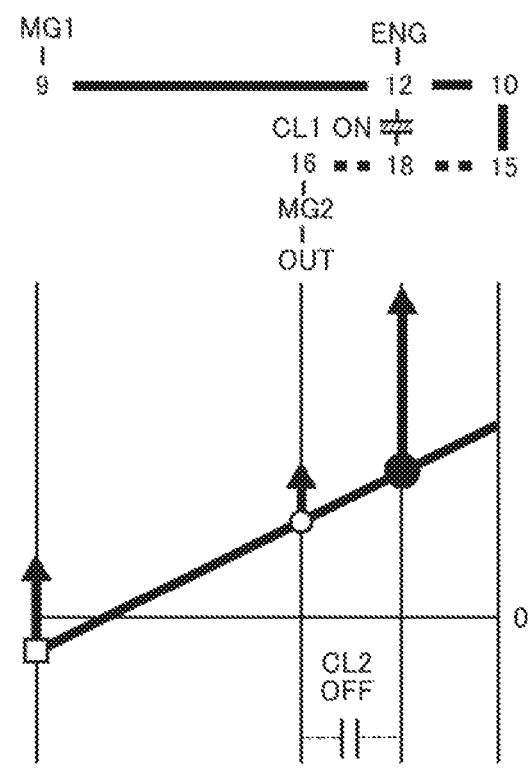
FIG. 5 is a nomographic diagram showing a situation in a HV-Low mode.
Figure 6:
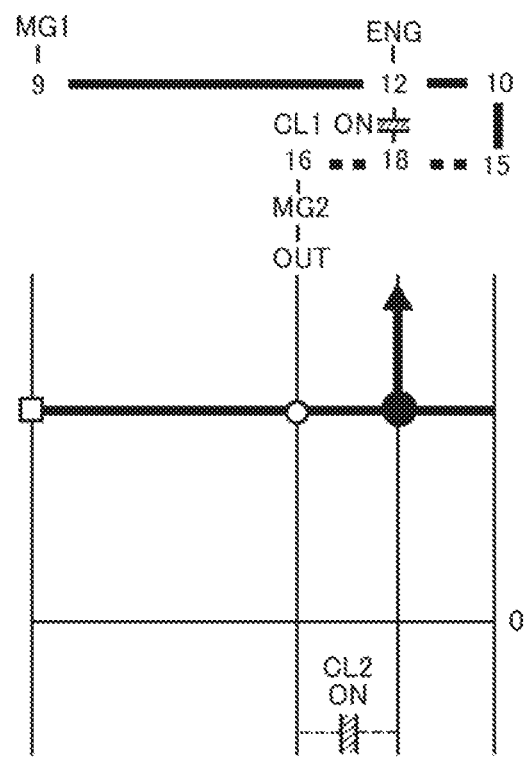
FIG. 6 is a nomographic diagram showing a situation in a fixed mode.

Rotational speeds of the rotary elements of the power split mechanism 6, and directions of torques of the engine 1, the first motor 2, and the second motor 3 in the HV-High mode, the HV-Low mode, and the fixed mode are indicated in FIGS. 4 to 6. In the nomographic diagrams shown in FIGS. 4 to 6, distances among the vertical lines represents a gear ratio of the power split mechanism 6, a vertical distance on the vertical line from the horizontal base line represents a rotational speed of the rotary member, an orientation of the arrow represents a direction of the torque, and a length of the arrow represents a magnitude of the torque.

As indicated in FIG. 4, in the HV-High mode, the second clutch CL2 is engaged, and the vehicle Ve is propelled by a drive torque generated by the engine 1 while establishing a reaction torque by the first motor 2. As indicated in FIG. 5, in the HV-Low mode, the first clutch CL1 is engaged, and the vehicle Ve is propelled by a drive torque generated by the engine 1 while establishing a reaction torque by the first motor 2.

A magnitude of the reaction torque of the first motor 2 possible to maintain speeds of the engine 1 and the first motor 2 in the HV-High mode differs from a magnitude of the reaction torque of the first motor 2 possible to maintain speeds of the engine 1 and the first motor 2 in the HV-Low mode. Specifically, given that an output torque of the engine 1 is Te, a required magnitude of the reaction torque established by the first motor 2 in the HV-Low mode may be expressed as "$(\rho1 \cdot \rho2/(1-\rho1 \cdot \rho2))$Te". By contrast, given that the output torque of the engine 1 is Te, a required magnitude of the reaction torque established by the first motor 2 in the HV-High mode may be expressed as "$(\rho1/(1+\rho1))$Te". In the above-expressed expressions, "$\rho1$" is a gear ratio of the power split section 7 (i.e., a ratio between teeth number of the ring gear 10 and teeth number of the sun gear 9), and "$\rho2$" is a gear ratio of the transmission section 8 (i.e., a ratio between teeth number of the ring gear 16 and teeth number of the sun gear 15). Here, it is to be noted that "$\rho1$" and "$\rho2$" are smaller than 1, respectively.

If the first motor 2 generates a torque greater than the above-explained reaction torque in the HV mode, a speed of the engine 1 is reduced by the torque of the first motor 2 increased from the reaction torque. By contrast, if the first motor 2 generates a torque smaller than the above-explained reaction torque in the HV mode, a speed of the engine 1 is increased by a part of torque generated by the engine 1. That is, in the HV mode, a speed of the engine 1 can be controlled by controlling the torque of the first motor 2. Specifically, in the HV mode, the torque of the first motor 2 is controlled in such a manner as to adjust the speed of the engine 1 to a target speed at which a total energy efficiency in the drive unit 4 including a fuel efficiency of the engine 1 can be optimized. The total energy efficiency in the drive unit 4 may be calculated by dividing a total energy consumption by a power to rotate the front wheels 5R and 5L.

As a result of establishing a reaction torque by the first motor 2, the first motor 2 serves as a generator. In this situation, a power of the engine 1 is partially translated into an electric power by the first motor 2, and the remaining power of the engine 1 is delivered to the ring gear 16 of the transmission section 8. The electric power thus translated by the first motor 2 may not only be supplied to the second motor 3 to operate the second motor 3 but also be accumulated in the electric storage device 37 to raise a state of charge level of the electric storage device 37.

In the fixed mode, both of the first clutch CL1 and the second clutch CL2 are engaged so that all of the rotary elements in the power split mechanism 6 are rotated at a same speed. That is, the output power of the engine 1 will not be translated into an electric energy by the first motor 2 and the second motor 3, and delivered entirely e.g., to the front wheels 5R and 5L through the power split mechanism 6. For this reason, a power loss such as a Joule loss associated with such energy conversion will not be caused in the fixed mode and hence power transmission efficiency can be improved.

In principle, the operating mode is shifted between the HV-Low mode and the HV-High mode via the fixed mode upon satisfaction of a shifting condition governed by a required drive force and a speed of the vehicle Ve. Specifically, when the condition to shift the operating mode between the HV-Low mode and the HV-High mode is satisfied, one of the first clutch CL1 and the second clutch CL2 being disengaged is engaged, and thereafter the other one of the first clutch CL1 and the second clutch CL2 being engaged is disengaged.

Turning to FIGS. 7A to 7D, there is shown one example of changes in speeds of the rotary elements of the power split mechanism 6 when the required drive force is increased and the operating mode is shifted from the HV-High mode to the HV-Low mode. In the following explanation, the example shown in FIGS. 7A to 7D will be made on the assumption that the vehicle Ve is propelled at a constant speed, for the sake of convenience. In the situation shown in FIG. 7A, the vehicle Ve is propelled in the HV-High mode, and the second clutch CL2 is engaged. In this situation, therefore, the sun gear 15, the carrier 18, and the ring gear 16 are rotated at speeds governed by a gear ratio of a gear train from the ring gear 16 to the drive wheels 5R and 5L, and a speed of the vehicle Ve. Specifically, the engine 1 connected to the carrier 12 is rotated at a speed lower than the rotational speed of the carrier 18.

Figure 7A:
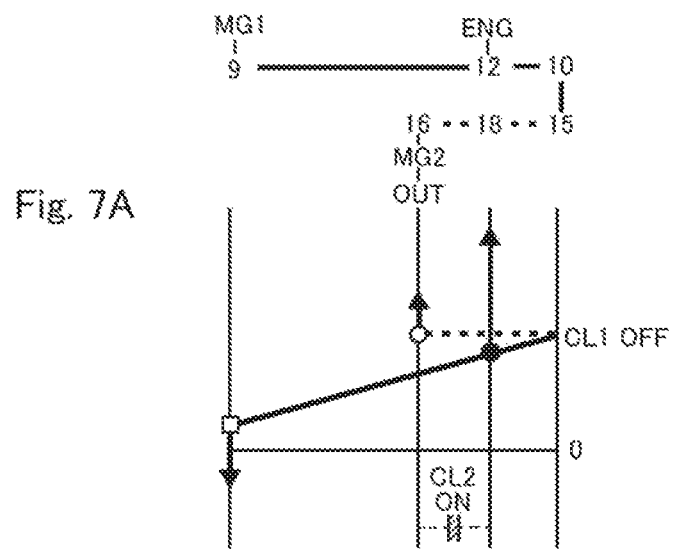
FIGS. 7A to 7D are nomographic diagrams showing changes in rotational speeds of rotary elements when shifting an operating mode from the HV-High mode to the HV-Low mode.
Figure 7B:
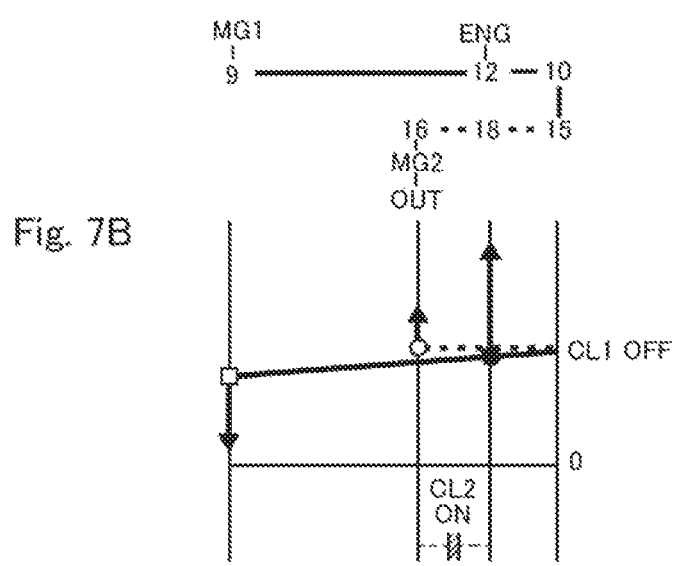

FIG. 7B shows a situation immediately before the operating mode is shifted from the HV-High mode to the fixed mode. In this situation, the reaction torque to maintain the speed of the engine 1 becomes insufficient as a result of reducing the reaction torque established by the first motor 2, or increasing the torque of the engine 1. Consequently, the rotational speed of the first motor 2 and the rotational speed of the carrier 12 connected to the engine 1 are increased, and a speed difference between the carrier 12 and the carrier 18 serving as the rotary members 20 and 21 of the first clutch CL1 is reduced to an allowable value to engage the first clutch CL1. Such allowable value of the speed difference between the rotary members 20 and 21 of the clutch CL as a "predetermined value" of the embodiment is determined based on configurations of the dog teeth 22 and the dog teeth 23.

Figure 7C:
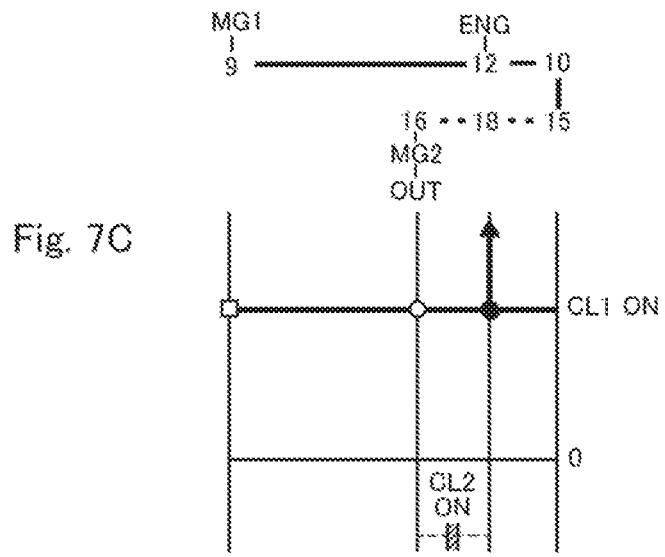

FIG. 7C shows a situation in which the operating mode is shifted to the fixed mode. In this situation, both of the first clutch CL1 and the second clutch CL2 are engaged. During propulsion in the fixed mode, therefore, the speed of the first motor 2 is raised from the level shown in FIG. 7B.

Figure 7D:
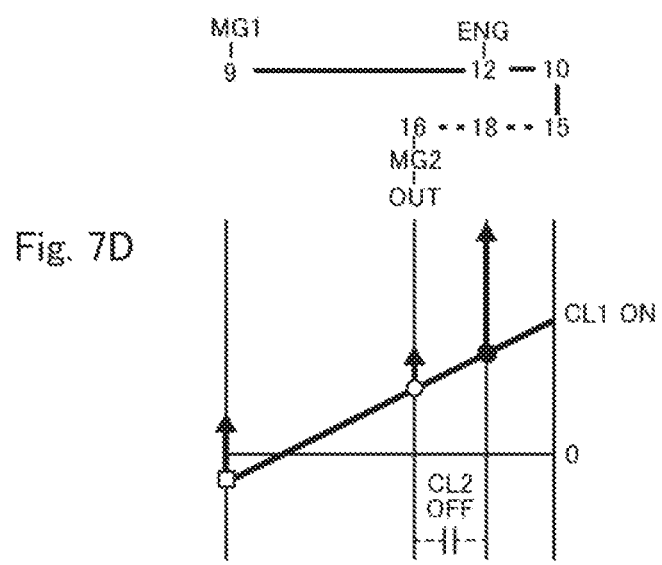

FIG. 7D shows a situation in which the operating mode is further shifted to the HV-Low mode. In this situation, the speed of the engine 1 is raised higher than those in the HV-High mode and the fixed mode. Specifically, after shifting the operating mode temporarily to the fixed mode as shown in FIG. 7C, the second clutch CL2 is disengaged, and thereafter the rotational speed of the first motor 2 is reduced to rotate the first motor 2 at a low speed in the reverse direction.

In the case of shifting the operating mode from the HV-High mode to the HV-Low mode, the first clutch CL1 is engaged even if rotational speeds of the rotary members 20 and 21 are different to some extent so as to shift the operating mode promptly.

In this situation, in order to prevent a reduction in a drive force, or in order to change a speed of the engine 1 at a predetermined rate, the first motor 2 is establishing a reaction torque of predetermined magnitude.

For example, when the first motor 2 generates the torque in the direction to reduce the speed of the first motor 2, an electric power is generated by the first motor 2 in an amount corresponding to a product of the speed and the torque of the first motor 2. By contrast, when the first motor 2 generates the torque in the direction to increase the speed of the first motor 2, the electric power is consumed by the first motor 2 in the amount corresponding to the product of the speed and the torque of the first motor 2. That is, in the situations shown in FIGS. 7A and 7B, the first motor 2 serves as a generator. By contrast, in the situation shown in FIG. 7D, the first motor 2 serves as a motor.

Specifically, in the situation shown in FIG. 7B, the first motor 2 serves as a generator while establishing the reaction torque. In this situation, when the first clutch CL1 is engaged as indicated in FIG. 7C, the speed of the first motor 2 is changed abruptly, and consequently an amount of electric power generation by the first motor 2 is changed abruptly.

An upper limit input power to the electric storage device 37 and an upper limit output power from the electric storage device 37 are governed by specifications of the electric storage device 37, and the upper limit input power and the upper limit output power vary depending on a temperature, a state of charge level etc. of the electric storage device 37. The upper limit input power to the electric storage device 37 and the upper limit output power from the electric storage device 37 will also be described commonly as the "upper limit power" hereinafter.

For example, if the first clutch CL1 is engaged when the first motor 2 generates electric power close to the upper limit value of the electric storage device 37 during propulsion in the HV-High mode, the generation amount of the first motor 2 will be increased abruptly by a change in the speed of the first motor 2. Consequently, the generation amount of the first motor 2 will exceed the upper limit input power to the electric storage device 37 thereby damaging the electric storage device 37.

Thus, the input power to the electric storage device 37 or the output power from the electric storage device 37 will be changed abruptly when the clutch CL is engaged to shift the operating mode. In order to limit damage to the electric storage device 37 due to overcharge or overdischarge resulting from such abrupt change in the input power or output power to/from the electric storage device 37, the control system according to the embodiment of the present disclosure restricts the electric power to be applied or to be discharged to/from the electric storage device 37 less than the upper input limit power or the upper limit output power, before the clutch CL is engaged. To this end, the control system according to the embodiment of the present disclosure executes the routine shown in FIG. 8.

Figure 8:
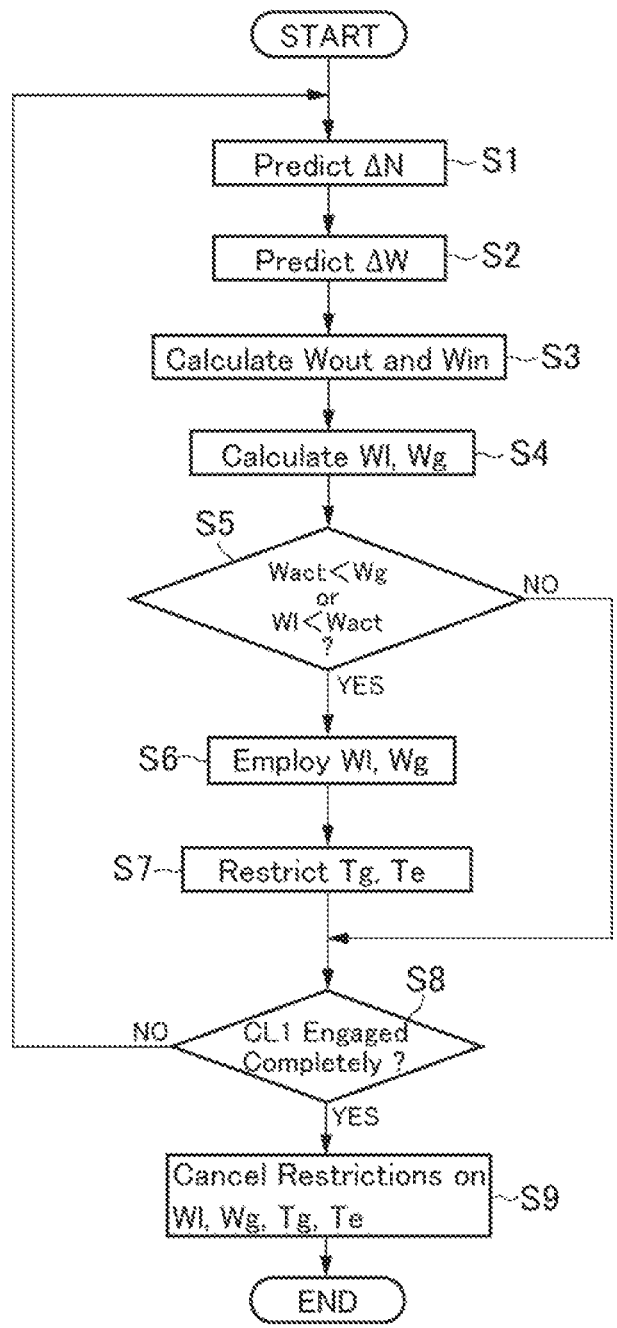
FIG. 8 is a flowchart showing one example of a routine executed by the control system according to the exemplary embodiment of the present disclosure.

The routine shown in FIG. 8 is commenced when a determination to engage the first clutch CL1 or the second clutch CL2 is made to shift the operating mode from the HV-High mode or the HV-Low mode to the fixed mode while the first motor 2 establishes a reaction torque Tg. As described, the operating mode is shifted between the HV-High mode and the HV-Low mode via the fixed mode. Therefore, the routine shown in FIG. 8 is also executed when shifting the operating mode between the HV-High mode and the HV-Low mode.

Hereinafter, an example of shifting the operating mode from the HV-High mode to the fixed mode will be explained with reference to FIG. 8. In this case, the first clutch CL1 will be engaged to establish the fixed mode, and in power split mechanism 6, the carrier 18 serves as the rotary member 20 of the first clutch CL1 and the carrier 12 connected to the input shaft 14 serves as the rotary member 21 of the first clutch CL1. As described, when shifting the operating mode from the HV-High mode to the fixed mode, a rotational speed of the carrier 12 serving as the rotary member 21 is increased so that a speed difference between the carrier 12 and the carrier 18 serving as the rotary member 20 is reduced. As also described, each tooth tip of the dog teeth 22 of the rotary member 20 and each tooth tip of the dog teeth 23 of the rotary member 21 is individually chamfered to expedite engagement of the first clutch CL1 even if the rotary members 20 and 21 are rotated at different speeds. That is, the first clutch CL1 can be engaged if the speed difference between the carrier 12 and the carrier 18 is less than an allowable value governed by a width of the chamfered surface of each of the dog teeth 22 of the rotary member 20 and a width of the chamfered surface of each of the dog teeth 23 of the rotary member 21. Here, the width of the front chamfered surface of each of the dog teeth 22 in the rotational direction is individually set wider than the width of the rear chamfered surface of each of the dog teeth 22, and the width of the front chamfered surface of each of the dog teeth 23 in the rotational direction is individually set narrower than the width of the rear chamfered surface of each of the dog teeth 23. Therefore, the allowable value of the speed difference between the carrier 12 and the carrier 18 at which the first clutch CL1 can be engaged varies depending on whether e.g., the carrier 12 is rotated faster than the carrier 18. However, it takes some time to reduce the speed difference between carrier 12 and the carrier 18. In this situation, in order not to reduce an acceleration response or the like, an engagement operation of the first clutch CL1 has to be completed within an allowable time which can ensure a desirable acceleration response. At step S1, therefore, a speed difference $\Delta N$ between the carrier 12 and the carrier 18 to be reduced until the dog teeth 22 and the dog teeth 23 are started to be engaged is predicted.

Figure 9:
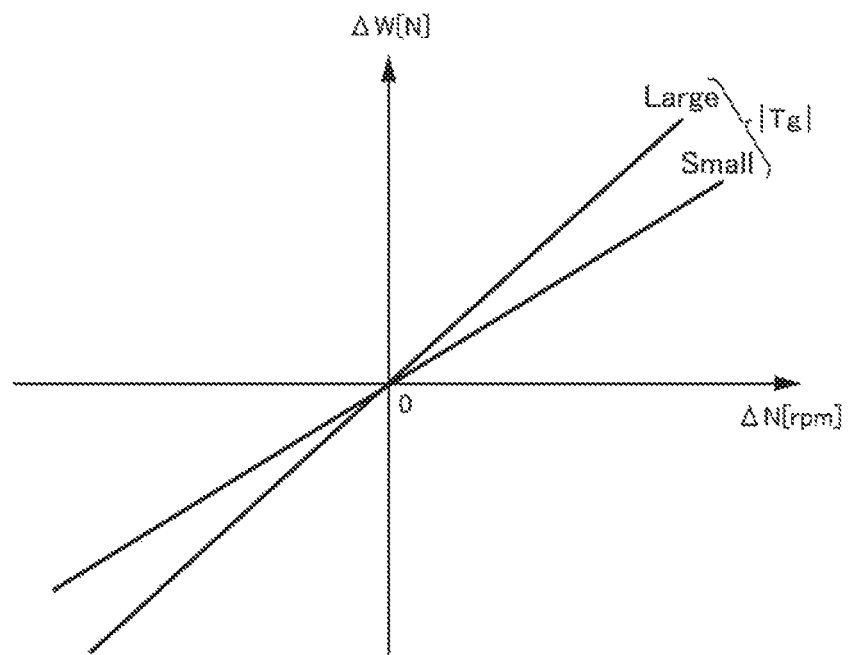
FIG. 9 shows one example of a map for determining a change amount of the electric power generated or consumed by a first motor.

Then, the routine progresses to step S2 to predict a change amount $\Delta W$ of the electric power generated (or consumed) by the first motor 2, on the basis of an expected change in the speed of the first motor 2 given that the first clutch CL1 is engaged in the situation that the speed difference between the carrier 12 and the carrier 18 is $\Delta N$ predicted at step S1. Specifically, the change amount $\Delta W$ can be predicted by multiplying a current torque Tg of the first motor 2 by the predicted speed difference $\Delta N$ between the carrier 12 and the carrier 18 corresponding to the expected change in the speed of the first motor 2. Optionally, the change amount $\Delta W$ may be calculated taking account of an energy consumption due to iron loss or copper loss. Instead, the change amount $\Delta W$ may also be predicted with reference to a map shown in FIG. 9 determining a relation between the change amount $\Delta W$ and the speed difference $\Delta N$.

Then, the routine progresses to step S3 to calculate a current upper limit input power Win possible to be applied to the electric storage device 37, and a current upper limit output power Wout possible to be discharged from the electric storage device 37. As described, the upper limit input power Win and the upper limit output power Wout are governed by the specifications of the electric storage device 37, and vary depending on a temperature, a state of charge level etc. of the electric storage device 37. At step S3, therefore, the upper limit input power Win and the upper limit output power Wout are calculated based e.g., on a current temperature and a current state of charge level of the electric storage device 37. In the following explanations, the electric power discharged from the electric storage device 37 will be defined as a positive value, and the electric power accumulated in the electric storage device 37 will be defined as a negative value.

Thus, the upper limit input power Win to the electric storage device 37 and the upper limit output power Wout from the electric storage device 37 are governed by the specifications and condition of the electric storage device 37, and hence the upper limit input power Win and the upper limit output power Wout are different from a maximum power consumption and a maximum power generation of the first motor 2. That is, the first motor 2 may generate electric power greater than the upper limit input power Win to the electric storage device 37, and may consume electric power greater than the upper limit output power Wout from the electric storage device 37. As described, a power consumption or a power generation of the first motor 2 is changed abruptly when the clutch CL is engaged. Therefore, in order not to apply electric power greater than the upper limit input power Win to the electric storage device 37, and in order not to discharge electric power greater than the upper limit output power Wout from the electric storage device 37, the control system according to the present disclosure is configured to restrict a power consumption and a power generation of the first motor 2 before engaging the clutch CL.

Figure 10:
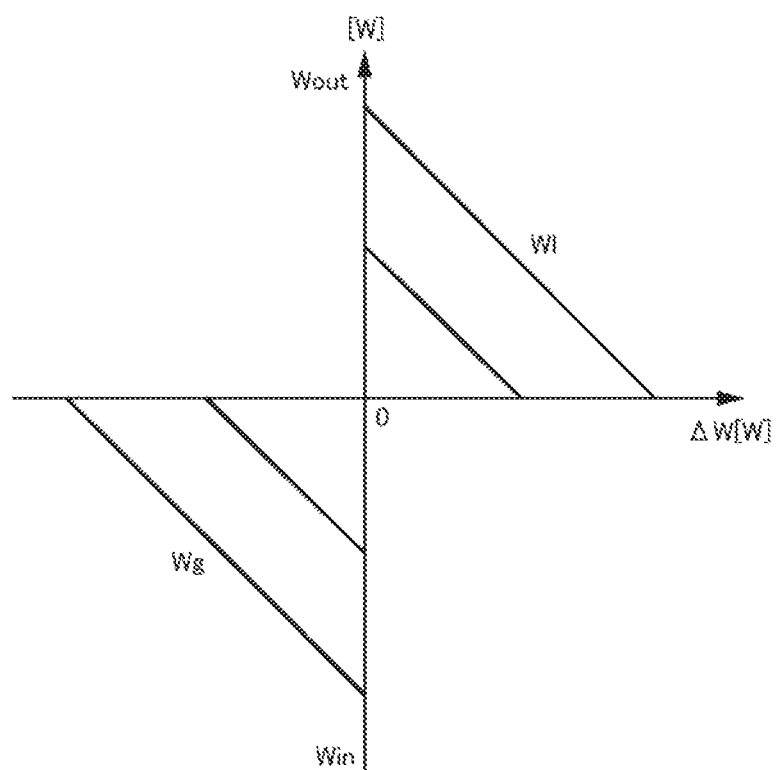
FIG. 10 is a map for determining a maximum allowable power consumption and a maximum allowable power generation by the first motor.

To this end, a current maximum allowable power consumption W1 by the first motor 2 and a current maximum allowable power generation Wg by the first motor 2 are calculated at step S4. The maximum allowable power consumption W1 and the current maximum allowable power generation Wg will also be described commonly as the "maximum allowable power" in the following explanations. For example, the maximum allowable power consumption W1 and the current maximum allowable power generation Wg may be calculated by subtracting the change amount $\Delta W$ of the electric power calculated at step S2 from the current upper limit input power Win or the current upper limit output power Wout. In the following explanations, the electric power consumed by the first motor 2 will be defined as a positive value, and the electric power generated by the first motor 2 will be defined as a negative value. Instead, the maximum allowable power consumption W1 and the current maximum allowable power generation Wg may also be calculated with reference to a map shown in FIG. 10 determining a relation between: the change amount $\Delta W$; and the current upper limit input power Win and the current upper limit output power Wout.

Thereafter, it is determined at step S5 whether an actual electric power Wact currently being consumed or generated by the first motor 2 is greater than the maximum allowable power consumption Wl or the maximum allowable power generation Wg by the first motor 2. If the actual electric power Wact currently being consumed or generated is greater than the maximum allowable power consumption Wl or the maximum allowable power generation Wg so that the answer of step S5 is YES, the routine progresses to step S6 to employ the maximum allowable power consumption Wl or the maximum allowable power generation Wg so as to restrict a power generation or power consumption by the first motor 2. Here, an actual speed difference ΔN between the carrier 12 and the carrier 18 may be changed from the predicted value of the speed difference ΔN at the point when the first clutch CL1 is engaged due to variation in detected value of a sensor, an engagement delay in the first clutch CL1 and so on. Therefore, a predetermined electric power calculated taking account of such change in the speed difference ΔN may be subtracted from the maximum allowable power consumption Wl and the current maximum allowable power generation Wg. Optionally, in the case that the first motor 2 consumes the electric power, the maximum allowable power generation Wg may also be set in addition to the maximum allowable power consumption Wl. By contrast, in the case that the first motor 2 generates the electric power, the maximum allowable power consumption Wl may also be set in addition to the maximum allowable power generation Wg.

Then, at step S7, a torque Tg of the first motor 2 is restricted to restrict the actual electric power Wact currently being consumed or generated by the first motor 2 equal to or less than the maximum allowable power consumption Wl or the maximum allowable power generation Wg. According to the example shown in FIGS. 7A to 7D, the first motor 2 generates torque in the direction to reduce a speed of the first motor 2. In this case, the speed of the first motor 2 is increased when the first clutch CL1 is engaged, and as a result, the generation amount of the first motor 2 will be increased. At step S6, therefore, the maximum allowable power generation Wg of the first motor 2 is set lower than the current upper limit input power Win to the electric storage device 37. Consequently, the torque Tg of the first motor 2 is restricted to reduce the generation amount of the first motor 2 equal to or less than the maximum allowable power generation Wg thereof.

On the other hand, if the torque Tg of the first motor 2 is reduced while maintaining the speed Ne of the engine 1, the speed Ne of the engine 1 is increased, and an increasing rate of the speed Ne of the engine 1 is increased with a reduction in the torque Tg of the first motor 2. That is, as a result of reducing the torque Tg of the first motor 2 at step S7, the speed Ne of the engine 1 may be increased excessively at a rate higher than a target increasing rate. At step S7, therefore, an output torque Te of the engine 1 is also restricted in accordance with a restricted amount of the torque Tg of the first motor 2. Specifically, in the case of reducing the torque Tg of the first motor 2, the output torque Te of the engine 1 is also reduced.

Then, it is determined at step S8 whether the first clutch CL1 is engaged completely. For example, the completion of engagement of the first clutch CL1 may be determined based on a detection value of a sensor arranged to detect a travel amount of the carrier 18 serving as the rotary member 20. Instead, the completion of engagement of the first clutch CL1 may also be determined based on whether a speed Ng of the first motor 2 is changed by slightly changing the torque Tg of the first motor 2.

If the first clutch CL1 has not yet been engaged completely so that the answer of step S8 is NO, the routine returns to step S1. By contrast, if the first clutch CL1 has been engaged completely so that the answer of step S8 is YES, the routine progresses to step S9 to cancel the restriction on the maximum allowable power consumption Wl or the maximum allowable power generation Wg, and to cancel the restrictions on the torque Tg of the first motor 2 and the output torque Te of the engine 1. Consequently, the condition of the vehicle Ve is returned to the condition before step S6.

By contrast, if the actual electric power Wact currently being consumed or generated is equal to or less than the maximum allowable power consumption Wl or the maximum allowable power generation Wg so that the answer of step S5 is NO, the power consumption or the power generation by the first motor 2 will not exceed the current upper limit input power Win or the current upper limit output power Wout to/from the electric storage device 37. In this case, therefore, the routine skips steps S6 and S7 and progresses to step S8. Here, in the case that the answer of step S5 is NO, the torque Tg of the first motor 2 and the output torque Te of the engine 1 will not be changed even if the maximum allowable power consumption Wl or the maximum allowable power generation Wg is reduced at step S6, and even if the torque Tg of the first motor 2 and the output torque Te of the engine 1 are restricted at step S7. Therefore, the determination at step S5 may be skipped, and the maximum allowable power consumption Wl or the maximum allowable power generation Wg may be reduced at step S6 and the torque Tg of the first motor 2 and the output torque Te of the engine 1 may be restricted at step S7.

Figure 11:
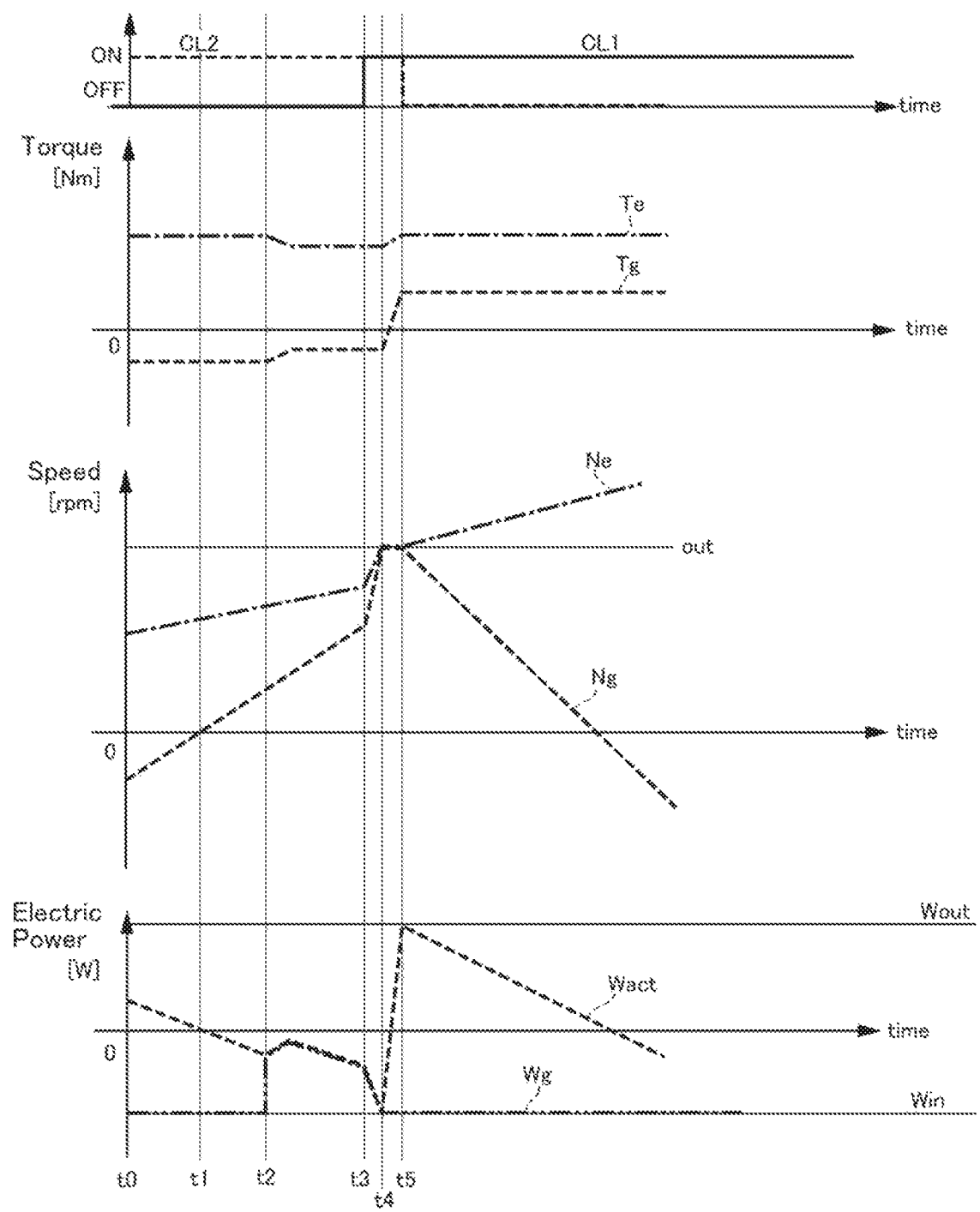
FIG. 11 is a time chart showing temporal changes in conditions of the clutches, the first motor, and an engine during execution of the routine shown in FIG. 8.

Turning to FIG. 11, there are shown temporal changes in conditions of the first clutch CL1, the second clutch CL2, the first motor 2, and the engine 1 during execution of the routine shown in FIG. 8.

In the example shown in FIG. 11, the condition to shift the operating mode from the HV-High mode to the HV-Low mode is satisfied at point t0. In this situation, therefore, the first motor 2 is controlled in such a manner as to reduce the speed difference ΔN between the carrier 12 and the carrier 18 serving as the rotary members 20 and 21 of the first clutch CL1. Specifically, at point t0, the first motor 2 is rotated in the opposite direction to the rotational direction of the engine 1, and in order to reduce the speed difference ΔN in the first clutch CL1, the speed Ng of the first motor 2 is increased from a negative value to the positive value. Consequently, the speed Ne of the engine 1 is also increased with the increase in the speed Ng of the first motor 2.

In this situation, specifically, the first motor 2 establishes a reaction torque in the direction to increase the speed Ng of the first motor 2 until point t1 at which a rotational direction of the first motor 2 is reversed, and in the direction to reduce the speed Ng of the first motor 2 after point t1. That is, until point t1, the first motor 2 is operated as a motor, and the electric storage device 37 discharges the electric power to the first motor 2 until point t1 as indicated as the positive value by the dashed curve. Then, after point t1, the first motor 2 is operated as a generator so that the electric power is supplied from the first motor 2 to the electric storage device 37 as indicated as the negative value by the dashed curve.

At point t2, a determination to engage the first clutch CL1 is made and the routine shown in FIG. 8 is commenced. According to the situation shown in FIG. 11, the speed Ng of the first motor 2 will be increased by engaging the first clutch CL1. In the example shown in FIG. 11, therefore, the change amount ΔW of the electric power generated by the first motor 2 after engaging the first clutch CL1 is calculated after point t2. The following explanation will be made based on an assumption that the maximum allowable power generation Wg calculated by subtracting the change amount ΔW of the electric power from the upper limit input power Win is greater than the actual electric power Wact currently being generated by the first motor 2 (that is, an absolute value of the maximum allowable power generation Wg is less than the actual electric power Wact). According to the example shown in FIG. 2, the maximum allowable power generation Wg is employed at point t2 to restrict a power generation by the first motor 2. Consequently, the reaction torque Tg of the first motor 2 is restricted so that the actual electric power Wact generated by the first motor 2 is restricted within the maximum allowable power generation Wg, and the output torque Te of the engine 1 is reduced with the reduction in the reaction torque Tg of the first motor 2. That is, an absolute value of the torque Tg of the first motor 2 and an absolute value of the output torque Te of the engine 1 are reduced.

At point t3, the speed difference ΔN in the first clutch CL1 is reduced equal to or less than the allowable value to engage the first clutch CL1, and hence the first clutch CL1 is engaged. Consequently, the speed Ng of the first motor 2 and the speed Ne of the engine 1 are raised abruptly to be synchronized with a speed of the ring gear 16 serving as the output element of the power split mechanism 6, and the actual electric power Wact generated by the first motor 2 is increased abruptly with such abrupt raise in the speed Ng of the first motor 2. However, the actual electric power Wact thus increased abruptly is restricted within the upper limit input power Win to the electric storage device 37. Here, the speed difference ΔN in the first clutch CL1 may also be calculated based on the speed of the output element of the power split mechanism 6 and the speed Ng of the first motor 2.

When the first clutch CL1 is engaged completely at point t4 so that the answer of step S8 of the routine shown in FIG. 8 is YES, the restriction on the maximum allowable power generation Wg is canceled, and the restrictions on the torque Tg of the first motor 2 and the output torque Te of the engine 1 are cancelled. Consequently, the output torque Te of the engine 1 is increased from point t4. Then, immediately after point t4, the second clutch CL2 is disengaged so that the operating mode is shifted to the HV-Low mode. In the HV-Low mode, the direction of the reaction torque Tg is reversed from that in the HV-High mode, therefore, the speed Ng of the first motor 2 is increased in the forward direction. In the example shown in FIG. 11, the target speed of the engine 1 after shifting the operating mode to the HV-High mode is set higher than the speed at the point when the operating mode is shifted from the HV High mode to the fixed mode. After point t5, therefore, the speed Ng of the first motor 2 is reduced to increase the speed Ne of the engine 1.

As described, the first power control system 35 and the second power control system 36 are connected to each other so that the electric power is exchanged directly therebetween without passing through the electric storage device 37. That is, overcharge or overdischarge of the electric storage device 37 may also be prevented by reducing power consumption of the second motor 3 when the actual electric power Wact being generated by the first motor 2 is reduced abruptly by engaging the clutch CL. That is, a method of limiting the damages to the electric storage device 37 should not be limited to the above-explained method of restricting the torque of the first motor 2 to restrict the actual electric power Wact being consumed or generated by the first motor 2 within the maximum allowable power consumption W1 or the maximum allowable power generation Wg by the first motor 2.

For example, in the case that the electric power generation of the first motor 2 is expected to be reduced by engaging the clutch CL, the actual electric power Wact being generated by the first motor 2 may be restricted within the maximum allowable power generation Wg by reducing a torque of the second motor 3. In this case, at step S7 of the routine shown in FIG. 8, the torque of the second motor 3 is restricted instead of the torque Tg of the first motor 2 or the output torque Te of the engine 1.

Figure 12:
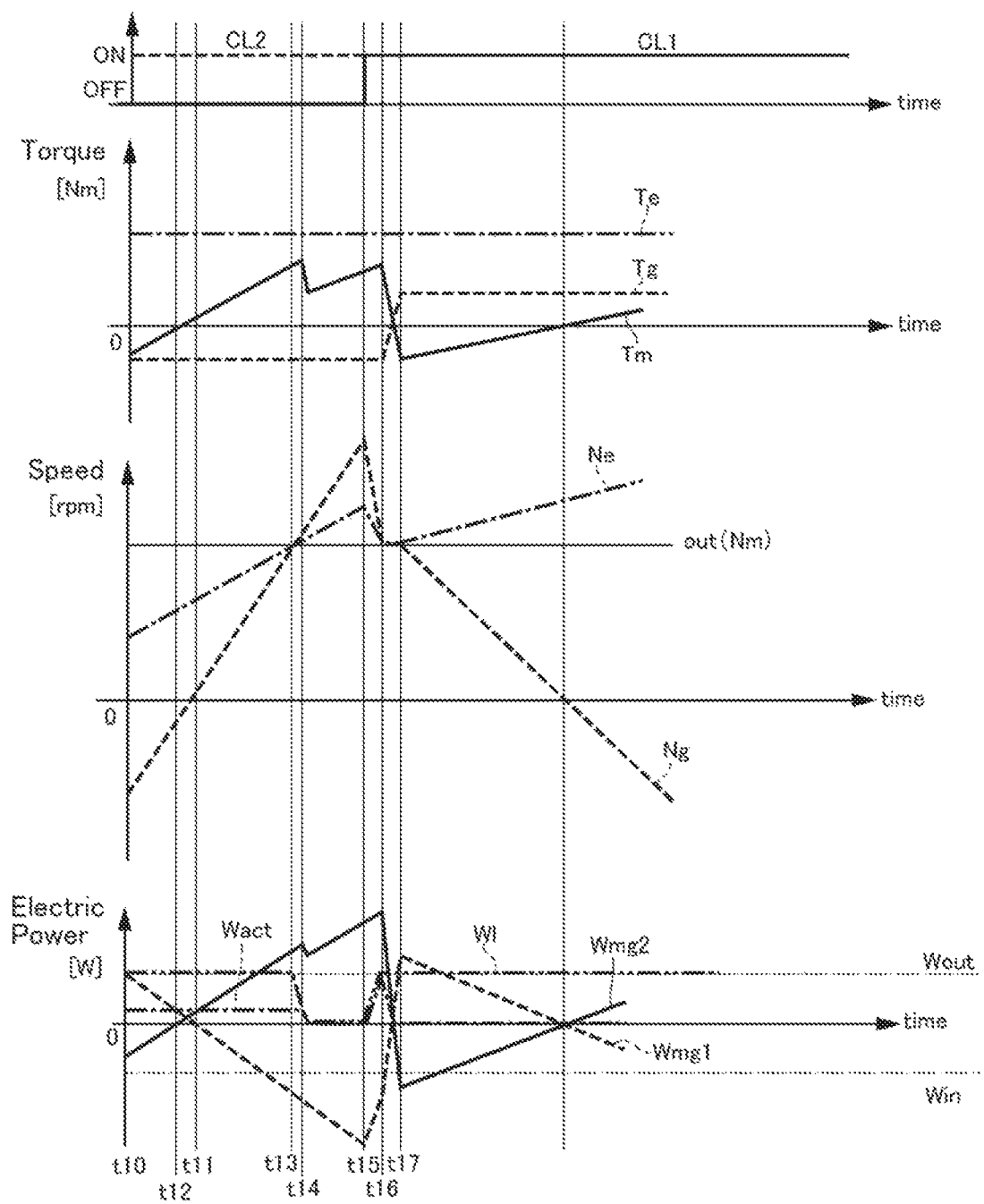
FIG. 12 is a time chart showing temporal changes in conditions of the clutches, the first motor, a second motor, and the engine in a case of restricting electric power consumed by the first motor by restricting torque of the second motor.

Turning to FIG. 12, there are shown temporal changes in conditions of the first clutch CL1, the second clutch CL2, the first motor 2, the second motor 3, and the engine 1 in the case of restricting the actual electric power Wact being consumed by the first motor 2 within the maximum allowable power consumption W1 by restricting the torque of the second motor 3. In FIG. 12, a torque Tm and a speed Nm of the second motor 3 are indicated as a torque of the output gear 19 or the ring gear 16 for the sake of explanation.

At point t10, the vehicle Ve is propelled in the HV-High mode while generating the energy to propel the vehicle Ve only by the engine 1. In this situation, the first motor 2 is rotated in the opposite direction to the rotational direction of the engine 1 while establishing a reaction torque Tg in the direction to increase a speed Ng of the first motor 2. That is, the first motor 2 serves as a motor while being subjected to an energy equal to or greater than an energy to propel the vehicle Ve. In this situation, therefore, the second motor 3 is operated as a generator to translate a surplus energy into an electric power. Specifically, the second motor 3 generates a negative torque in a direction to reduce the speed Nm of the second motor 3.

The condition to shift the operating mode from the HV-High mode to the HV-Low mode is satisfied at point t10, therefore, the first motor 2 is controlled in such a manner as to reduce the speed difference ΔN between the carrier 12 and the carrier 18 serving as the rotary members 20 and 21 of the first clutch CL1. Specifically, at point t10, the first motor 2 is rotated in the opposite direction to the rotational direction of the engine 1, and in order to reduce the speed difference ΔN in the first clutch CL1, the speed Ng of the first motor 2 is increased from a negative value toward the positive value. Eventually, a rotational direction of the first motor 2 will be reversed at point t11, and the speed Ng of the first motor 2 will be further increased in the forward direction. In this situation, the speed Ne of the engine 1 is also increased with the increase in the speed Ng of the first motor 2.

As a result of controlling the torque Tg of the first motor 2 in such a manner as to increase the speed Ne of the engine 1, the energy generated by the engine 1 is partially consumed to increase the speed Ne of the engine 1 and the speed Ng of the first motor 2. Consequently, the above-mentioned surplus energy is reduced, and the negative torque Tm of the second motor 3 is reduced gradually to zero at point t12 which is slightly before point t11. Then, a direction of the torque Tm of the second motor 3 is reversed and the torque Tm of the second motor 3 is further increased in the forward direction. In this situation, an actual electric power Wact as a total amount of an electric power Wmg1 being consumed or generated by the first motor 2 and an electric power Wmg2 being consumed or generated by the second motor 3 is maintained to a constant value from point t10 to point t13.

When the speed Ne of the engine 1, the speed Ng of the first motor 2, and the speed Nm of the second motor 3 are synchronized to one another at point t13, a determination to engage the first clutch CL1 is made and the routine shown in FIG. 8 is commenced. Since the speed Ng of the first motor 2 and the speed Nm of the second motor 3 are high at point t13, both of the electric power Wmg1 being generated by the first motor 2 and the electric power Wmg2 being consumed by the second motor 3 are high at point t13. In this situation, specifically, the electric power Wmg1 being generated by the first motor 2 is slightly less than the electric power Wmg2 being consumed by the second motor 3, and hence the electric power is being discharged from the electric storage device 37. Since the engine 1, the first motor 2, and the second motor 3 are rotated at the same speed, at point t13, the speed difference ΔN in the first clutch CL1 is substantially zero. At point t13, therefore, the maximum allowable power consumption W1 or the maximum allowable power generation Wg by the first motor 2 will not be restricted.

In the example shown in FIG. 12, the speed Ng of the first motor 2 is increased even after point t13 due to e.g., an overshooting of the speed Ng of the first motor 2. Otherwise, the speed Ng of the first motor 2 may also be increased as a result of engaging one of the rotary members 20 of the first clutch CL1 with the other one of the rotary members 21 of the first clutch CL1 rotated at a higher speed. Consequently, the speed difference ΔN in the first clutch CL1 is increased gradually after point t13, and the electric power Wmg1 generated by the first motor 2 by engaging the first clutch CL1 is increased as time proceeds. On the other hand, the torque Tm of the second motor 3 is also increased even after point t13 so as to consume the electric energy regenerated as a result of such increase in the speed Ng of the first motor 2. Consequently, the change amount ΔW of the electric power generated by the first motor 2 which is calculated at step S2 of the routine shown in FIG. 8 is increased so that the maximum allowable power consumption Wl by the first motor 2 is reduced after point t13.

In this situation, the actual electric power Wact is maintained to a constant value after point t13, and hence the maximum allowable power consumption Wl being reduced is equalized to the actual electric power Wact at point t14. As described, according to the example shown in FIG. 12, the overcharge or overdischarge of the electric storage device 37 is prevented by changing the electric power Wmg2 being consumed or generated by the second motor 3. For this purpose, the torque Tm of the second motor 3 is restricted from point t14. Specifically, the electric power Wmg1 generated by the first motor 2 which is to be reduced by engaging the first clutch CL1 is predicted, and the torque Tm of the second motor 3 is restricted in such a manner as to reduce the electric power Wmg2 consumed by the second motor 3 in an amount corresponding to the predicted value of the electric power Wmg1 generated by the first motor 2.

Engagement of the first clutch CL1 starts from point t15, and consequently the speed Ng of the first motor 2 and the speed Ne of the engine 1 are reduced from point t15. Then, when the first clutch CL1 is engaged at point t16, the speed Ne of the engine 1, the speed Ng of the first motor 2, and the speed Nm of the second motor 3 are synchronized to one another. That is, the operating mode is shifted from the HV-High mode to the fixed mode at point t16. Thus, although the actual electric power Wact is increased abruptly at point t15 by the reduction in the electric power Wmg1 generated by the first motor 2, the electric power Wmg2 consumed by the second motor 3 is reduced in the amount corresponding to the change in the electric power Wmg1 generated by the first motor 2. At point t16, therefore, the actual electric power Wact is restricted equal to or less than the upper limit output power Wout from the electric storage device 37.

In order to reduce the torque acting on the dog teeth of the second clutch CL2, the torque Tg of the first motor 2 and the torque Tm of the second motor 3 are reduced from point t16. Then, when the torque Tg of the first motor 2 and the torque Tm of the second motor 3 are reduced to zero, the second clutch CL2 is disengaged at point t17. Consequently, the operating mode is shifted from the fixed mode to the HV-Low mode. After, point t17, the speed Ng of the first motor 2 is controlled in such a manner as to adjust the speed Ne of the engine 1 to a target speed in the HV-Low mode.

Given that the electric power generated by the first motor can be supplied to an auxiliary such as an air-conditioner and another battery without passing through the electric storage device 37, the electric power applied to or discharged from the electric storage device 37 may also be restricted lower than the maximum allowable power consumption W1 or the maximum allowable power generation Wg by increasing the electric power supplied to the auxiliary. As described, the first power control system 35 and the second power control system 36 include the converter respectively. That is, a power loss resulting from generating the electric power by e.g., the first motor 2 or discharging the electric power from the electric storage device 37 may be changed by changing a boost level of the converter, even if the first motor 2 is operated at a predetermined operating point. Therefore, the electric power applied to or discharged from the electric storage device 37 may also be restricted lower than the maximum allowable power consumption Wl or the maximum allowable power generation Wg by changing the boost level of the converter.

Further, the maximum allowable power consumption Wl or the maximum allowable power generation Wg may also be set to a fixed value, which is calculated by obtaining a maximum amount of change in the speed of the first motor 2 based on a structure of the clutch CL, and subtracting an amount of change in the electric power generated or consumed given that the speed of the first motor 2 is changed in the maximum amount from the upper limit input power Win or the upper limit output power Wout to/from the electric storage device 37.

Thus, the control system according to the exemplary embodiment of the present disclosure is applied to the drive unit in which a rotational speed of one of the rotary members of the clutch is controlled by the motor establishing a reaction torque to deliver engine torque through the power split mechanism, and in which the operating mode is shifted by engaging the clutch. According to the exemplary embodiment of the present disclosure, before the clutch is engaged, the control system predicts the electric power to be consumed or generated by a change in the speed of the motor to be caused by engaging the clutch, so as to restrict the input power or the output power to/from the electric storage device. That is, when the clutch is engaged, the power consumption or the power generation of the motor being increased is restricted or consumed by the other device. According to the exemplary embodiment of the present disclosure, therefore, overcharge or overdischarge of the electric storage device may be prevented to limit damage to the electric storage device.

In addition, the above-mentioned avoidance mechanism 26 of the clutch CL shown in FIG. 2 prevents undesirable engagement of the clutch CL when a speed difference in the clutch CL is equal to or greater than a predetermined value. Therefore, the above-mentioned predetermined electric power calculated taking account of variation in detected value of the sensor may be reduced. That is, the input power or the output power to/from the electric storage device will not be restricted excessively even if the torque of the first motor or the second motor is restricted. In this case, therefore, reduction in the drive force can be prevented even if the electric power applied or discharged to/from the electric storage device.

Although the above exemplary embodiment of the present disclosure has been described, it will be understood by those skilled in the art that the present disclosure should not be limited to the described exemplary embodiments, and various changes and modifications can be made within the scope of the present disclosure. For example, the control system according to the exemplary embodiments of the present disclosure may also be applied to an electric vehicle having a high-power drive motor. Further, the control system according to the exemplary embodiments of the present disclosure may also be applied to a vehicle in which power generation or power consumption of a motor is changed by engaging the second clutch CL2.

What is claimed is:

1. A vehicle control system that is applied to a vehicle, the vehicle control system comprising:
   a prime mover;
   a first motor having a generating function;
   at least a pair of drive wheels;
   an electric storage device from which an electric power is supplied to the first motor, and to which an electric power generated by the first motor is supplied;
   a differential mechanism that includes a plurality of rotary elements including a first rotary element connected to the prime mover, a second rotary element connected to the first motor, and a third rotary element connected to the drive wheels, the differential mechanism delivering torque of the prime mover, at least partially, to the drive wheels when a reaction torque established by the first motor is applied to the differential mechanism;
   a clutch that is selectively engaged to transmit torque between a predetermined pair of the plurality of rotary elements of the differential mechanism, a speed of one of the rotary elements of the predetermined pair of the rotary elements being changed with a change in a speed of the first motor, and the clutch is allowed to be engaged when a speed difference between the predetermined pair of the rotary elements is less than a predetermined value and;
   a controller that controls the electric power applied to the electric storage device and the electric power discharged from the electric storage device, the controller being configured to:
      calculate an upper limit power possible to be discharged from the electric storage device or possible to be applied to the electric storage device when a condition to engage the clutch that is disengaged is satisfied, and
      restrict the electric power to be discharged from the electric storage device or to be applied to the electric storage device to an electric power equal to or less than, before engaging the clutch, a maximum allowable power to be consumed or generated by the first motor that is less than the upper limit power.

2. The vehicle control system as claimed in claim 1, wherein:
   the upper limit power is governed by specifications of the electric storage device, and
   the controller is further configured to:
      calculate a change amount of the electric power to be generated or consumed by the first motor by engaging the clutch, and
      calculate the maximum allowable power by subtracting the change amount of the electric power from the upper limit power.

3. The vehicle control system as claimed in claim 2, wherein the controller is further configured to:
   calculate the change in the speed of the first motor to be caused by engaging the clutch, and
   calculate the change amount of the electric power based on the change in the speed of the first motor and a torque of the first motor.

4. The vehicle control system as claimed in claim 2, wherein the controller is further configured to calculate the maximum allowable power by subtracting the change amount of the electric power and a predetermined electric power from the upper limit power.

5. The vehicle control system as claimed in claim 4, wherein the clutch includes an elastic member that prevents undesirable engagement of the clutch when a speed difference in the clutch is equal to or greater than the predetermined value.

6. The vehicle control system as claimed in claim 4, wherein the predetermined value at which the clutch is allowed to be engaged varies depending on whether a speed of the one of the rotary elements of the predetermined pair of the rotary elements is faster than a speed of the other one of the rotary elements of the predetermined pair of the rotary elements.

7. The vehicle control system as claimed in claim 1, wherein the controller is further configured to restrict the torque of the first motor to restrict the electric power to be discharged from the electric storage device or to be applied to the electric storage device to an electric power equal to or less than the maximum allowable power.

8. The vehicle control system as claimed in claim 7, wherein the controller is further configured to restrict an output torque of the prime mover in accordance with the restriction on the torque of the first motor.

9. The vehicle control system as claimed in claim 1, wherein:
   the vehicle further includes a second motor that is connected to the drive wheels in a torque transmittable manner, and to the first motor to exchange the electric power therebetween, and
   the controller is further configured to restrict the torque of the second motor so as to restrict the electric power to be discharged from the electric storage device or to be applied to the electric storage device to an electric power equal to or less than the maximum allowable power before the clutch is engaged.

10. The vehicle control system in claim 1, wherein the controller is further configured to:
    determine whether an actual electric power currently being consumed or generated is greater than the maximum allowable power while the clutch is still disengaged, and
    restrict the electric power to be discharged from the electric storage device or to be applied to the electric storage device to an electric power equal to or less than the maximum allowable power, when actual electric power is greater than the maximum allowable power.

11. The vehicle control system as claimed in claim 1, wherein the controller is further configured to:
    determine whether the clutch is engaged, and cancel the restriction on the electric power to be discharged from the electric storage device or to be applied to the electric storage device to an electric power equal to or less than the maximum allowable power when an engagement of the clutch is determined.

* * * * *